Patented July 27, 1943

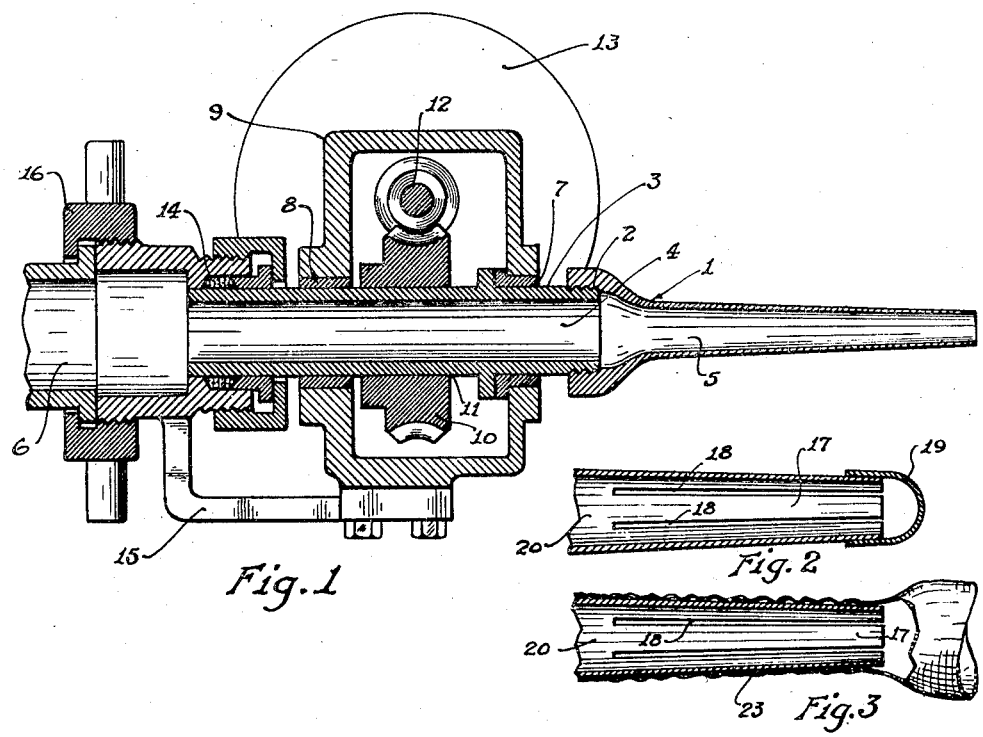
Fig. 1
Fig. 2
Fig. 3
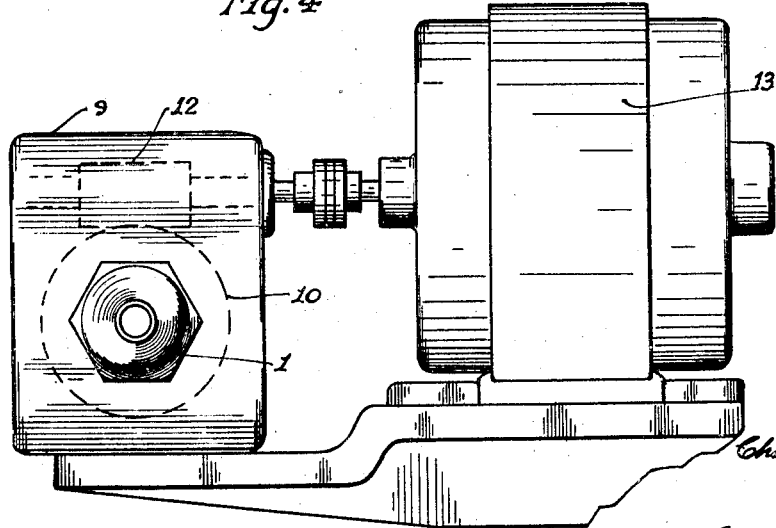
Fig. 4

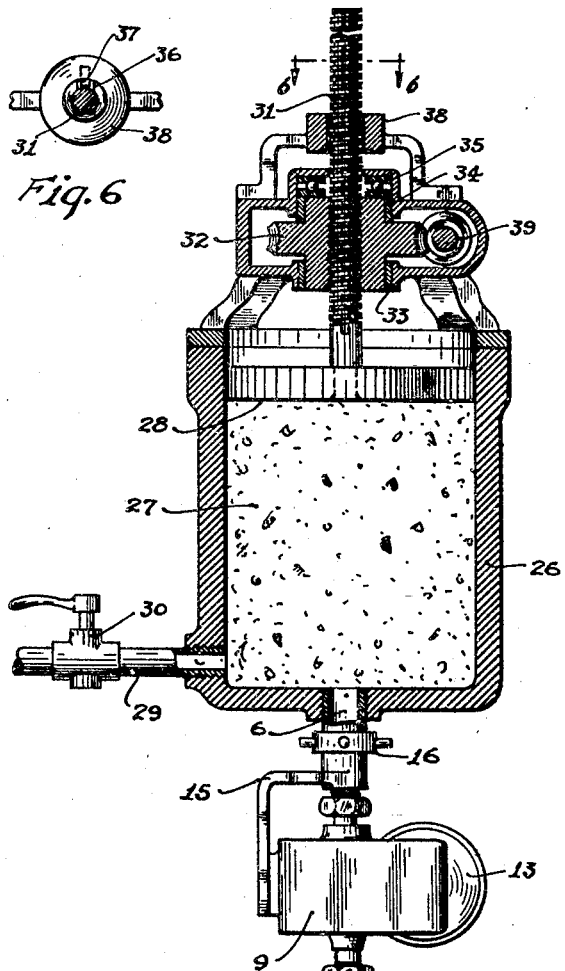
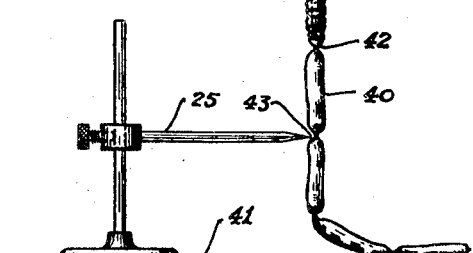

2,325,446

UNITED STATES PATENT OFFICE 2,325,446

SAUSAGE STUFFING NOZZLE

Charles T. Walter, Chicago, Ill., assignor to Industrial Patents Corporation, Chicago, Ill., a corporation of Delaware Original application February 10, 1937, Serial No. 125,148. Divided and this application March 16, 1939, Serial No. 262,243

5 Claims. (Cl. 17—41)

This invention relates to a sausage stuffing nozzle.

This application is a division of my application for Sausage linker, Serial No. 125,148, filed February 10, 1937, which has issued as Patent No. 2,168,693, dated August 8, 1939.

One of the objects of the invention is to provide apparatus for use in stuffing and linking sausage.

Another object of the invention is to provide a novel rotatable sausage stuffing nozzle adapted to provide resistance to the slippage of casing material passed from the nozzle in the stuffing operation.

Other objects of the invention will be apparent from the description and claims which follow.

In the drawings the similar reference characters in the several figures indicate similar parts.

Figure 1 is a cross-sectional view of the rotatable sausage stuffing device.

Figure 2 is a detailed cross-sectional view of one end of the sausage stuffing nozzle of the present invention.

Figure 3 is a detailed sectional view similar to Figure 2 showing the casing at the position it assumes during the stuffing operation.

Figure 4 is an end view of the apparatus shown in Figure 1.

Figure 5 is a view, partly in section, of the apparatus of the present invention.

Figure 6 is a sectional view taken on line 6—6 of Figure 5.

Stuffing nozzle 1 is mounted as by threads 2 on rotating spindle 3 provided with passage 4 through its center communicating the passage 5 of nozzle 1 with sausage stuffer outlet 6. Spindle 3 is rotatably mounted in bearings 7 and 8 in housing 9. Spindle 3 may be rotatably driven by any suitable means as for example, worm wheel 10, firmly secured to the spindle at 11. Worm wheel 10 engages with worm 12, driven by motor 13. Spindle 3 extends through housing 9 into stuffing box 14 integral with bracket 15 supported by housing 9. Stuffing box 14 may be fastened to the stuffer outlet by any suitable device such as a threaded ring 16. The rotatable nozzle illustrated in Figure 1 may be attached to any convenient source of sausage meat. Figures 2 and 3 illustrate a stuffing nozzle which may be employed with the apparatus. The stuffing nozzle is shown in these figures as split into a number of segments 17 by narrow slots 18. The tension of sausage material forced through the stuffing horn causes the individual segments 17 to move outwardly from the center of the nozzle.

A cap 19 may be placed over the end of the expanding nozzle 20 to facilitate threading a casing on the nozzle. After the casing has been placed on the nozzle, the cap is removed. The expanding type of nozzle 20 provides a driving force between the surface of the nozzle and the casing to insure that the casing rotates with the nozzle during the stuffing operation.

In employing the apparatus shown in Figure 1, a suitable length of casing is placed upon nozzle 1 and motor 13 started. Sausage meat under pressure is admitted through outlet 6 to passage 4 and enters nozzle 1 through passage 5. If one end of the casing is closed over the end of the stuffing nozzle, a length of sausage will start to form. By reason of the rotation of the nozzle through the turning of worm gear 10 by worm 12, the length of forming sausage coming off the horn will rotate. When a suitable length of sausage has issued from the nozzle, the operator pinches the casing, forming a link of sausage. The length of sausage which has been formed up to the point of pinching the casing will stop rotating. That portion of the length of sausage which is being formed will continue to rotate, resulting in the formation of one end of a link at the point of pinching.

A convenient gauge 25 as shown in Figure 5 may be arranged to aid the operator in determining the points at which to pinch the casing to obtain a series of links of the desired length. To secure the best results in a device of this type, it is necessary that the rate of discharge of sausage meat into the casing be uniform. Apparatus for carrying out this function is illustrated in Figure 5, wherein the outlet 6 communicates with stuffer cylinder 26 containing sausage meat 27. Piston 28 is adapted to slide within cylinder 26. The sausage meat may be introduced under pressure to stuffer cylinder 26 through pipe 29, controlled by a stuffer valve 30. In ordinary operations the capacity of cylinder 26 is approximately fifty pounds of sausage meat. Piston 28 is carried by a threaded stem 31, the screw thread of which coacts with a mating thread in worm wheel 32. When worm wheel 32 is rotating in its bearings 33 and 34, rod 31 will move up or down depending upon the direction of rotation of the worm wheel. A ball-thrust bearing is provided at 35. The piston rod 31 is slotted as shown at 36. Slot 36 coacts with a sliding key 37 held in collar 38 to prevent rod 31 turning with the motion of worm wheel 32. Worm wheel 32 is turned by worm 39 driven by any suitable source of power, as for example, a reversible electric motor which may be used to raise or lower the piston 28. With the apparatus depicted in Figure 5, the speed at which the piston travels downwardly during the working stroke will be substantially constant, resulting in a constant rate of speed of formation of each sausage link 40.

For convenience the mechanism may be mounted in a vertical position on a table top 41 on which is also placed the gauge 25. The operation of the device will be understood by reference to Figure 5. Assuming that chamber 26 is empty, the operator opens valve 30 which will communicate chamber 26 with a sausage meat reservoir as shown. The driving motor operating worm 39 is set to draw piston 28 away from the closed end of the cylinder 26. As the piston moves, the space beneath becomes filled with sausage meat entering from pipe 29. When the piston has reached the upper end of its travel, the driving motor may be stopped and valve 30 closed. A sausage casing 23 may then be placed on stuffing nozzle 1 and motor 13 started. Simultaneously, the driving motor worm 39 is started to cause piston 28 to be driven downwardly. The operator now pinches the end of the casing a short distance from the end of the nozzle as at 42. Sausage meat issuing from nozzle 1 at a uniform rate will form lengths such as link 40. As each neck 42 passes gauge point 43, the operator again pinches the casing at 42, starting a new link.

The speed relation between rotating nozzle 1 and the rate of extrusion of the sausage meat should be such as to give from two to three twists of the casing between each link.

It will be appreciated that an apparatus such as shown in Figure 5 may be constructed compactly such that a number of such devices may be fed from a single sausage meat reservoir.

I claim:

1. A sausage stuffing nozzle comprising a rotatable non-resilient casing storage portion and a free end provided with a plurality of longitudinal slots providing a plurality of resilient spaced segments integral with said non-resilient portion and extending longitudinally therefrom.

2. A sausage stuffing nozzle comprising a rotatable tube and a second tube connected therewith, said second tube being provided with a non-resilient continuous walled casing storage portion at its attached end and a resilient discharge free end portion having a plurality of longitudinal slots therein providing a plurality of resilient spaced segments extending longitudinally from said casing storage portion.

3. In a sausage stuffing nozzle adapted to be attached to a rotatable sausage supply tube, a non-resilient continuous walled casing storage portion and a resilient discharge portion, said resilient discharge portion comprising a plurality of longitudinal slots therein providing a plurality of spaced resilient segments extending longitudinally from said casing storage portion.

4. A sausage stuffing nozzle comprising a non-resilient casing storage portion and a free end provided with a plurality of longitudinal slots providing a plurality of resilient spaced segments integral with said non-resilient portion and extending longitudinally therefrom.

5. A sausage stuffing nozzle comprising a tube and a second tube connected therewith, said second tube being provided with a non-resilient continuous walled casing storage portion at its attached end and a resilient discharge free end portion having a plurality of longitudinal slots therein providing a plurality of resilient spaced segments extending longitudinally from said casing storage portion.

CHARLES T. WALTER.